(12) United States Patent
Todd

(10) Patent No.: US 11,713,706 B2
(45) Date of Patent: Aug. 1, 2023

(54) CATALYTIC CONVERTER ANTI-THEFT DEVICES AND SYSTEMS

(71) Applicant: William Todd, Morro Bay, CA (US)

(72) Inventor: William Todd, Morro Bay, CA (US)

( * ) Notice: Subject to any disclaimer, the term of this patent is extended or adjusted under 35 U.S.C. 154(b) by 0 days.

(21) Appl. No.: 17/696,817

(22) Filed: Mar. 16, 2022

(65) Prior Publication Data
US 2022/0403769 A1     Dec. 22, 2022

Related U.S. Application Data

(60) Provisional application No. 63/162,155, filed on Mar. 17, 2021.

(51) Int. Cl.
*B60R 25/00*     (2013.01)
*F01N 13/18*     (2010.01)

(52) U.S. Cl.
CPC .......... *F01N 13/1805* (2013.01); *B60R 25/00* (2013.01); *F01N 13/1855* (2013.01); *F01N 2260/22* (2013.01)

(58) Field of Classification Search
CPC ................................ B60R 25/00; F01N 13/18
See application file for complete search history.

(56) References Cited

U.S. PATENT DOCUMENTS

| | | | | |
|---|---|---|---|---|
| 3,444,775 | A * | 5/1969 | Hills | F16B 31/021 411/3 |
| 3,937,121 | A * | 2/1976 | Schubert | F16B 31/021 411/2 |
| 4,250,146 | A * | 2/1981 | Bailey | F01N 3/2875 60/299 |
| 4,719,752 | A * | 1/1988 | Hall | F01N 13/08 280/421 |
| 5,287,763 | A * | 2/1994 | Nagashima | B62D 1/184 74/531 |
| 6,584,768 | B1 * | 7/2003 | Hecker | F01N 3/035 55/318 |
| 7,971,676 | B2 * | 7/2011 | Dusa, II | F01N 13/18 248/551 |
| 8,453,784 | B2 * | 6/2013 | Dusa, II | F01N 13/1822 248/551 |
| 2002/0166720 | A1 * | 11/2002 | Kusabiraki | F01N 13/08 181/240 |
| 2010/0258703 | A1 * | 10/2010 | Meislahn | F01N 13/1822 248/551 |
| 2011/0036130 | A1 * | 2/2011 | Hisler | F01N 3/28 70/57.1 |
| 2015/0117941 | A1 * | 4/2015 | Wahlstrom | F01N 13/1855 403/315 |
| 2019/0234275 | A1 * | 8/2019 | Jang | B01D 53/94 |
| 2021/0253062 | A1 * | 8/2021 | Tamagni | F01N 13/18 |

* cited by examiner

Primary Examiner — Barry Gooden, Jr.
(74) Attorney, Agent, or Firm — Cygnet IP Law, P.A.; Stephen W. Aycock, II

(57) ABSTRACT

Catalytic converter anti-theft devices and systems are described.

9 Claims, 23 Drawing Sheets

1802    FIG. 18

CATALYTIC CONVERTER ANTI-THEFT DEVICES AND SYSTEMS

RELATED APPLICATIONS

This application claims the benefit of U.S. Application No. 63/162,155, entitled "Automotive Catalytic Converter Anti-Theft Device," and filed on Mar. 17, 2021, which is incorporated herein by reference in its entirety.

FIELD

Some implementations relate generally to anti-theft devices, and, more particularly, to catalytic converter anti-theft devices and systems.

BACKGROUND

Catalytic converter theft is a common occurrence. Attempts have been made to develop devices to help prevent theft of catalytic converters. For example, some conventional catalytic converter anti-theft devices may be time-consuming and difficult to install. Also, some conventional catalytic converter anti-theft devices may visually obscure the catalytic converter, which can hinder efforts to inspect the catalytic converter such as during a vehicle inspection.

Embodiments were conceived in light of the above-mentioned problems and limitations, among other things. The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

Some implementations can include a catalytic converter anti-theft system comprising an exhaust flange bolt shield configured to be attached to one or more points near the exhaust flange via one or more corresponding security bolt fasteners, wherein the exhaust flange bolt shield includes one or more bolt covers configured to cover one or more exhaust flange bolts. The system can also include an exhaust pipe section cover configured to be attached to an exhaust pipe section adjacent the catalytic converter so as to cover at least a portion of the exhaust pipe section, wherein the exhaust pipe section cover is attached to the exhaust pipe section via one or more arcuate members and one or more corresponding security fasteners.

In some implementations, each of the one or more corresponding security fasteners is a break-away security nut. In some implementations, the exhaust flange bolt shield and the exhaust pipe section cover are formed from one or more of break-away security nut is configured to break away at a given torque level.

In some implementations, the exhaust flange bolt shield and the exhaust pipe section cover are formed from one or more of steel, stainless steel, hardened steel, case hardened steel, and tempered steel. In some implementations, the exhaust flange bolt shield and the exhaust pipe section cover are separate pieces.

In some implementations, the exhaust flange bolt shield includes: a first recess disposed at a first end of the exhaust flange bolt shield configured to fit over a first catalytic converter manifold bolt, and a second recess disposed at a second end of the exhaust flange bolt shield configured to fit over a second catalytic converter manifold bolt.

In some implementations, the exhaust pipe section cover includes a body portion having two apertures for fastening the exhaust pipe section cover to the exhaust pipe, and a first angled member attach to a first side of the body portion and a second angled member attached to a second side of the body portion opposite the first side of the body portion.

Some implementations can include a catalytic converter anti-theft system comprising a plurality of breakaway security bolts each configured to attach the catalytic converter to a manifold, wherein each breakaway security bolt includes: a breakaway head attached to a shank that shears at a given torque, a bolt stop, and a threaded portion. In some implementations, the catalytic converter anti-theft system can also include an upper spring stop. In some implementations, the catalytic converter anti-theft system can also include an upper spring stop. In some implementations, the breakaway security bolts are formed from one or more of steel, hardened steel, and tempered steel.

Some implementations can include a catalytic converter anti-theft system comprising a plurality of breakaway security bolts each configured to attach the catalytic converter to a manifold, wherein each breakaway security bolt includes: a breakaway head attached to a shank that shears at a given torque, an upper spring stop, a bolt stop, and a threaded portion. The system can also include an exhaust pipe section cover configured to be attached to an exhaust pipe section adjacent the catalytic converter so as to cover at least a portion of the exhaust pipe section, wherein the exhaust pipe section cover is attached to the exhaust pipe section via one or more arcuate members and one or more corresponding breakaway security nuts.

In some implementations, each of the one or more corresponding security fasteners is a break-away security nut. In some implementations, the break-away security nut is configured to break away at a given torque level.

In some implementations, the exhaust pipe section cover is formed from one or more of steel, stainless steel, hardened steel, case hardened steel, and tempered steel. In some implementations, the exhaust pipe section cover includes a body portion having two apertures for fastening the exhaust pipe section cover to the exhaust pipe, and a first angled member attach to a first side of the body portion and a second angled member attached to a second side of the body portion opposite the first side of the body portion.

Some implementations can include a catalytic converter anti-theft system comprising a single piece catalytic converter cover configured to cover an exhaust pipe section and one or more exhaust manifold bolts, wherein the single piece catalytic converter cover is attached to an exhaust system at one end of the single piece catalytic converter. In some implementations, the single piece catalytic converter cover is configured to be attached to an exhaust pipe section adjacent the catalytic converter so as to cover at least a portion of the exhaust pipe section, wherein the single piece catalytic converter cover is attached to the exhaust pipe section via one or more arcuate members and one or more corresponding breakaway security nuts.

In some implementations, each of the one or more corresponding security fasteners is a break-away security nut. In some implementations, the break-away security nut is configured to break away at a given torque level.

In some implementations, the single piece catalytic converter cover is formed from one or more of steel, hardened steel, and tempered steel. In some implementations, the single piece catalytic converter cover includes a body portion having two apertures for fastening the single piece catalytic converter cover to the exhaust pipe.

In some implementations, the single piece catalytic converter cover can include a dove tail configuration at an end of the single piece catalytic converter cover opposite to the end connected to the manifold.

DETAILED DESCRIPTION

In general, implementations of the disclosed subject matter help prevent theft of catalytic converters by providing a shield over bolts attaching the catalytic converter to the manifold, as well as a cover over portions of exhaust that may frequently be cut to remove a catalytic converter, security nuts, security bolts, or a combination of two or more of the above. In addition to providing additional metal to make cutting away a catalytic converter more difficult, some implementations include a single attachment point such that if an attempt is made to cut the anti-theft device, the device will vibrate about the single attachment point and make noise to discourage a would-be thief. In addition to providing security features to help prevent catalytic converter theft, implementations can be easily installed as compared to some conventional catalytic converter anti-theft devices and may permit inspection of the catalytic converter (and associated serial number, etc.) for vehicle tag or registration purposes.

Any implementations described herein can include high temper rods or braided stainless on the inside of the system (e.g., shield, cover, or fastener elements), outside of the system, or both. Any implementations described herein can include components such as the shield or cover with case hardened edges. Any implementations described herein can include stainless steel components.

Some implementations can include components formed from high Rockwell C hardness material, rods, or braided stainless steel wire spot welded or otherwise affixed to the steel components. For example, hardened rods or wire cable can be welded to the underside of the device to thwart cutting by a power tool such as a Sawzall. As well, selective hardening the edges of the shield may be used to thwart a Sawzall.

Some implementations can affixed at a single point covering the vulnerable parts of the exhaust so that when cut with a Sawzall, the antitheft system vibrates to make a loud alarming sound to scare away a potential thief.

It will be appreciated that the examples below may include reference to a Toyota Prius or a Toyota Tundra pickup truck. These example vehicles are used herein as non-limiting examples for purposes of illustrating and explaining the disclosed subject matter.

Figure 12:
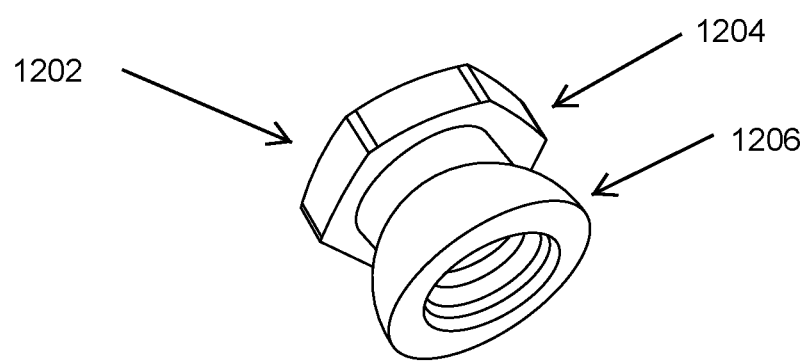
FIG. 12 is a diagram of an example breakaway nut in accordance with some implementations.
Figure 13:
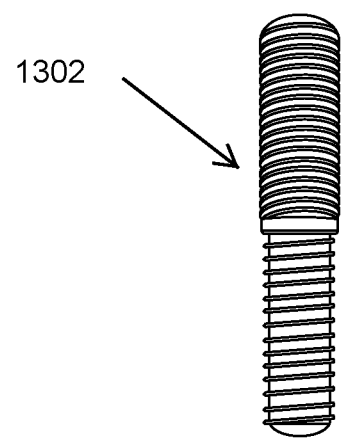
FIG. 13 is a diagram of an example conversion stud in accordance with some implementations.

FIGS. 1-5 show various views and detail of an example catalytic and antitheft system with long exhaust pipe section cover in accordance with some implementations. In particular, a catalytic converter system 102 includes numerous points that are susceptible to thieves attempting to steal one or more pieces of the catalytic converter. For example, bolts 106 used to attach the catalytic converter to the exhaust manifold of a vehicle can be protected with an exhaust flange bolt shield 104 configured to be attached at one or more points near the exhaust flange via one or more corresponding security bolt fasteners 114 (e.g., including a conversion stud and a breakaway nut as shown in FIGS. 12 and 13). The exhaust flange bolt shield 104 can include one or more bolt covers configured to cover one or more exhaust flange bolts 106.

An exhaust pipe section cover 110 is configured to be attached to an exhaust pipe section adjacent the catalytic converter so as to cover at least a portion of the exhaust pipe section. The exhaust pipe section cover 110 is attached to the exhaust pipe section via one or more arcuate members 108 (e.g., ubolts) and one or more corresponding security fasteners 112. In some implementations, each of the one or more corresponding security fasteners is a break-away security nut (as shown in greater detail in FIG. 12).

The exhaust flange bolt shield 104 and/or the exhaust pipe section cover 110 are attached using a break-away security nut (e.g., 112) that is configured to break away at a given torque level.

The exhaust flange bolt shield 104 and/or the exhaust pipe section cover 110 are formed from one or more of steel, hardened steel, case hardened steel, and tempered steel.

In some implementations, the exhaust flange bolt shield 104 and the exhaust pipe section cover 110 are separate pieces.

Figure 1:
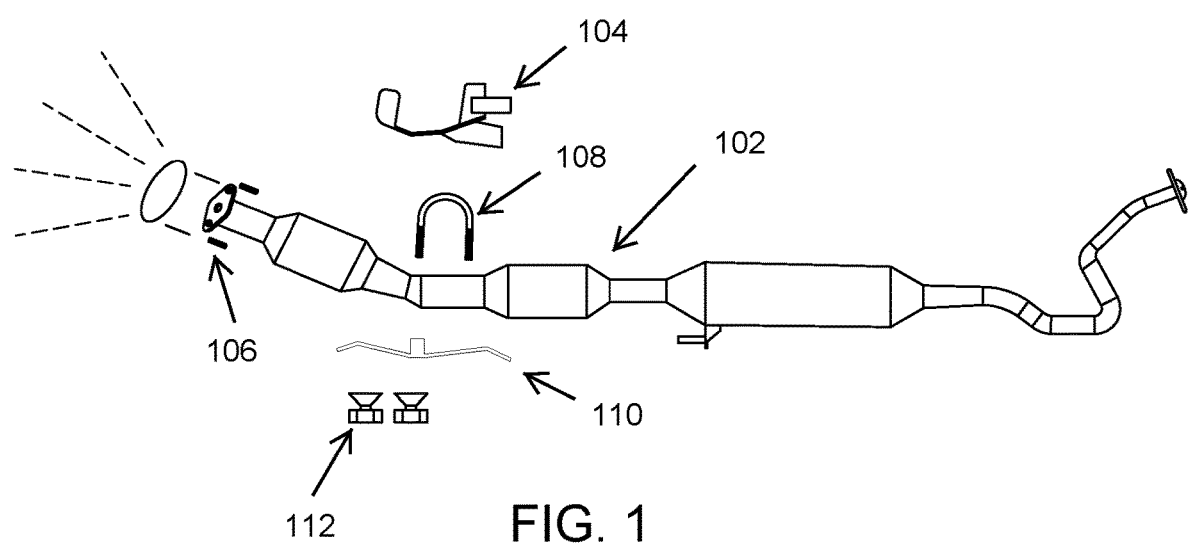
FIG. 1 is a diagram showing an exploded view of an example catalytic converter and antitheft system with long exhaust pipe section cover in accordance with some implementations.
Figure 2:
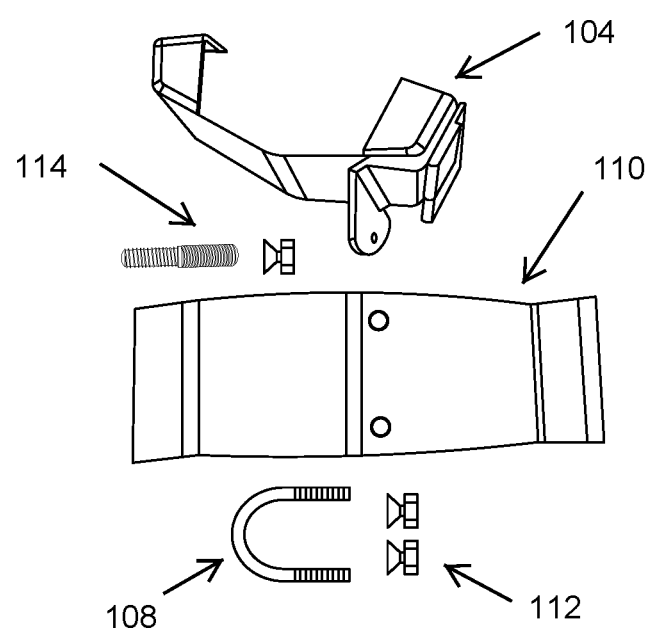
FIG. 2 is a diagram showing parts of an example catalytic converter antitheft system with long exhaust pipe cover in accordance with some implementations.
Figure 3:
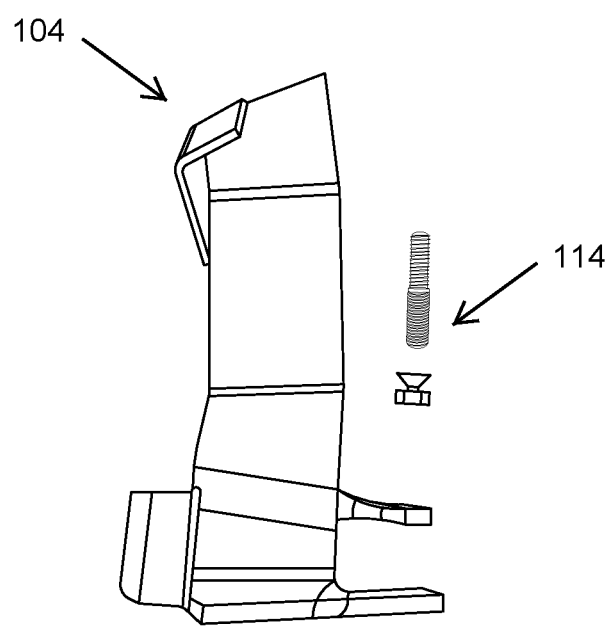
FIGS. 3 and 4 are diagrams of an example exhaust flange bolt shield in accordance with some implementations.
Figure 4:
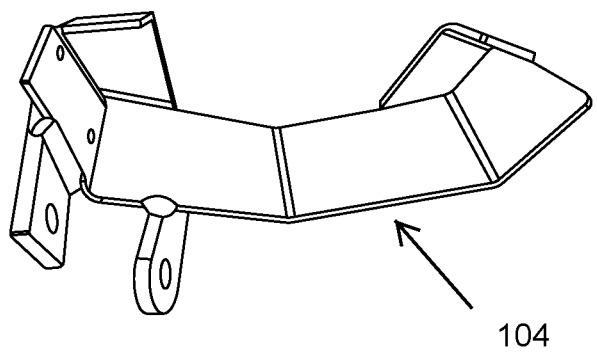

As shown in FIGS. 3 and 4, the exhaust flange bolt shield 104 includes a first recess disposed at a first end of the exhaust flange bolt shield configured to fit over a first catalytic converter manifold bolt, and a second recess disposed at a second end of the exhaust flange bolt shield configured to fit over a second catalytic converter manifold bolt.

Figure 5:
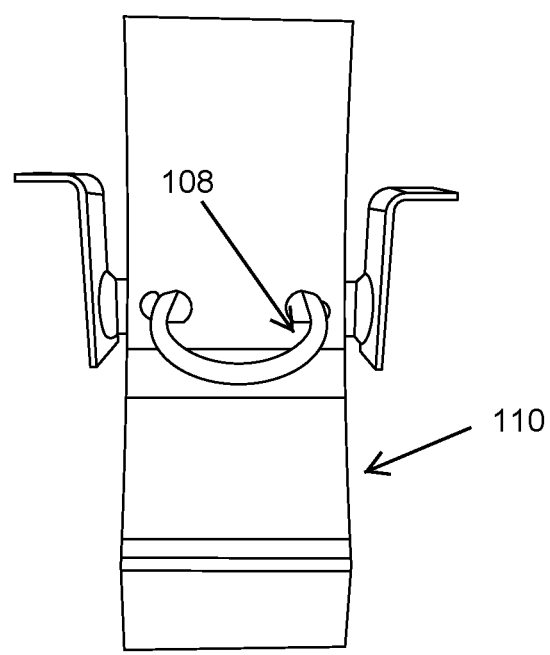
FIG. 5 is a diagram of an example exhaust pipe section cover in accordance with some implementations.

As shown in FIG. 5, the exhaust pipe section cover 110 includes a body portion having two apertures for fastening the exhaust pipe section cover to the exhaust pipe, and a first angled member (or flange) attached to a first side of the body portion and a second angled member (or flange) attached to a second side of the body portion opposite the first side of the body portion. Note the flanges butt up against the bolts of the exhaust system thereby to prevent access to the bolts and to prevent the bolts from being removed. These flanges provide a secondary means of protection that may or may not be used in all implementations.

Figure 6:
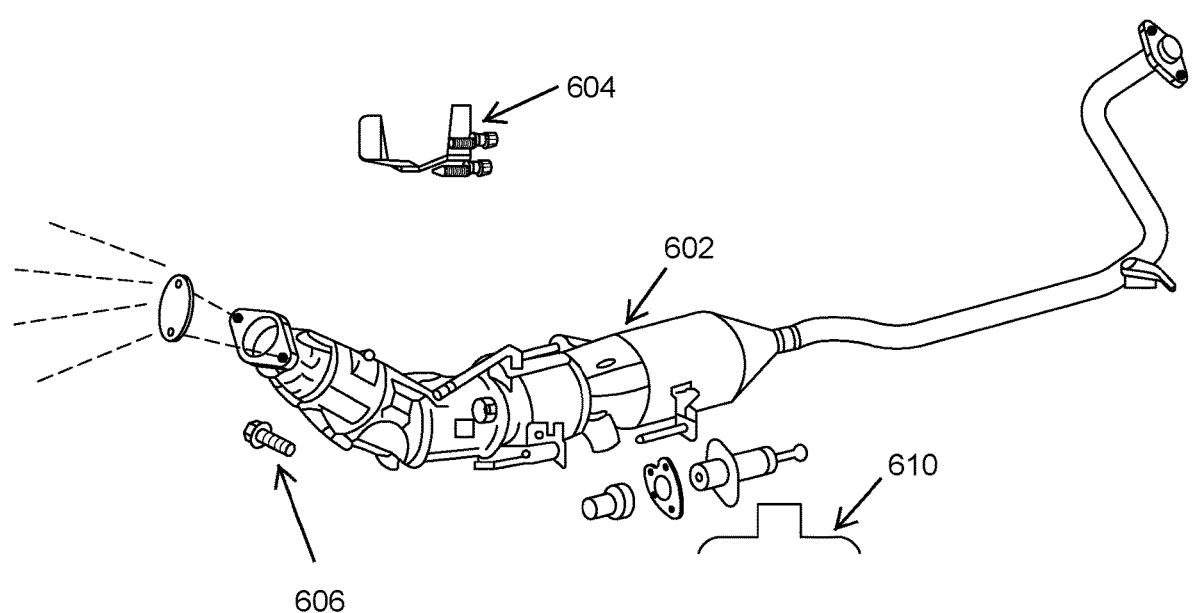
FIG. 6 is a diagram showing an exploded view of an example catalytic converter and antitheft system with short exhaust pipe section cover in accordance with some implementations.
Figure 7:
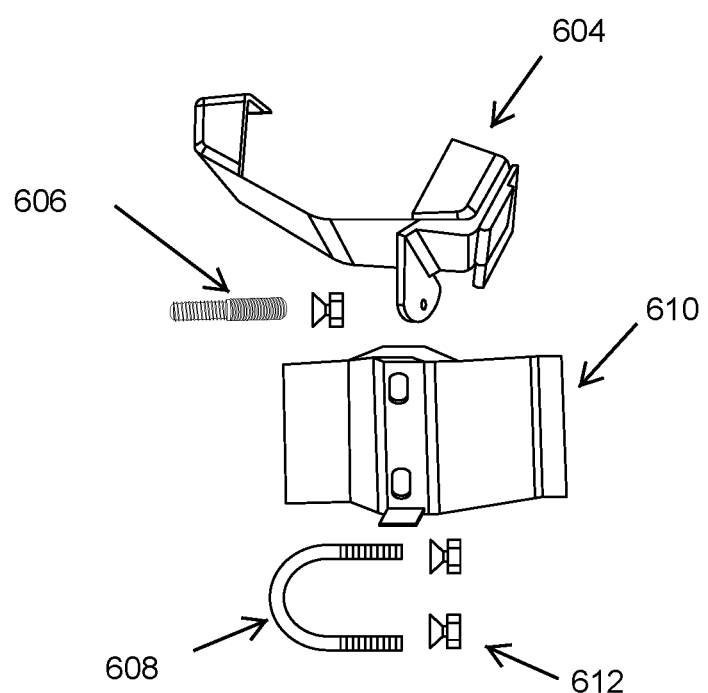
FIG. 7 is a diagram showing parts of an example catalytic converter antitheft system with short exhaust pipe cover in accordance with some implementations.

FIGS. 6 and 7 are diagrams showing an example catalytic converter and antitheft system with short exhaust pipe section cover in accordance with some implementations. In particular, bolts used to attach the catalytic converter to the exhaust manifold of a vehicle can be protected with an exhaust flange bolt shield 604 configured to be attached at one or more points near the exhaust flange via one or more corresponding security bolt fasteners 606 (e.g., including a conversion stud and a breakaway nut as shown in FIG. 7). The exhaust flange bolt shield 604 can include one or more bolt covers configured to cover one or more exhaust flange bolts.

An exhaust pipe section cover 610 is configured to be attached to an exhaust pipe section adjacent the catalytic converter so as to cover at least a portion of the exhaust pipe section. The exhaust pipe section cover 610 is attached to the exhaust pipe section via one or more arcuate members 608 (e.g., ubolts) and one or more corresponding security fasteners 612. In some implementations, each of the one or more corresponding security fasteners is a break-away security nut (as shown in greater detail in FIG. 12).

The exhaust flange bolt shield 604 and/or the exhaust pipe section cover 610 are attached using a break-away security nut (e.g., 612) that is configured to break away at a given torque level.

The exhaust flange bolt shield 604 and/or the exhaust pipe section cover 610 are formed from one or more of steel, hardened steel, case hardened steel, and tempered steel.

In some implementations, the exhaust flange bolt shield 604 and the exhaust pipe section cover 610 are separate pieces. In other implementations, an exhaust flange bolt shield and the exhaust pipe section cover can be a single piece (e.g., see FIG. 14).

As shown in FIG. 7, the exhaust flange bolt shield 604 includes a first recess disposed at a first end of the exhaust flange bolt shield configured to fit over a first catalytic converter manifold bolt, and a second recess disposed at a second end of the exhaust flange bolt shield configured to fit over a second catalytic converter manifold bolt. Also, in some implementations, the exhaust flange bolt shield 604 can include a single attachment point that is used to attach the exhaust flange bolt shield 604 to the vehicle using the conversion stud and breakaway nut combination 606. When a single attachment point is used, the exhaust flange bolt shield 604 may vibrate and make noise when an attempt is made to saw the exhaust flange bolt shield 604. In other implementations, the exhaust flange bolt shield 604 can be attached with more than one attachment point.

As shown in FIG. 7, the exhaust pipe section cover 610 includes a body portion having two apertures for fastening the exhaust pipe section cover to the exhaust pipe, and a first angled member attach to a first side of the body portion and a second angled member attached to a second side of the body portion opposite the first side of the body portion.

Figure 8:
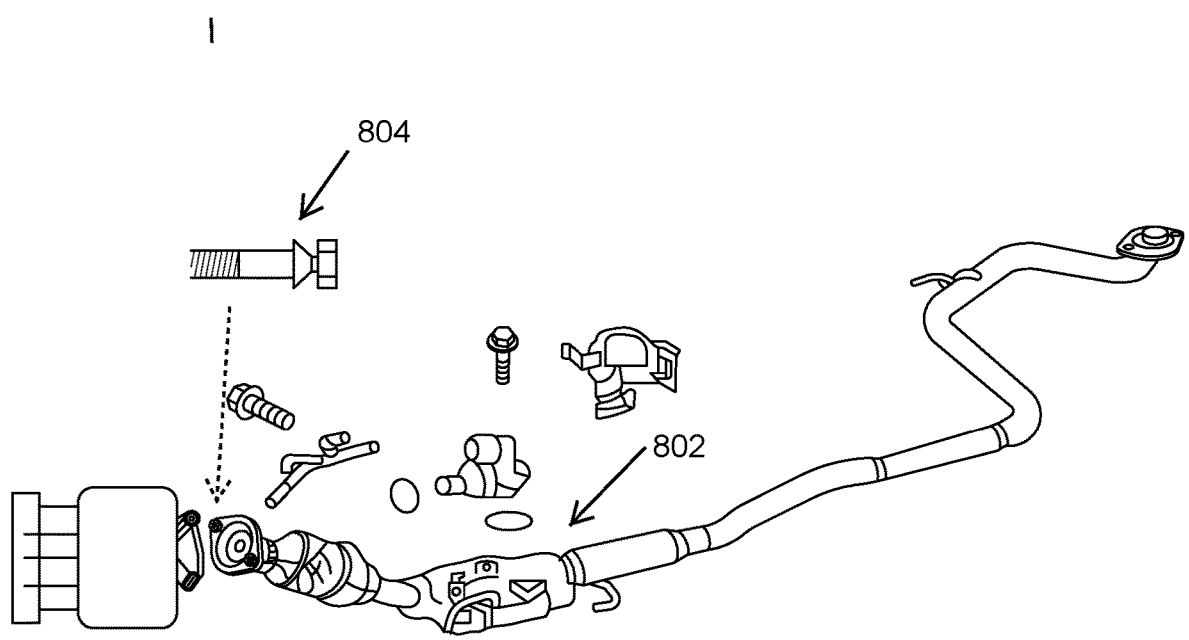
FIG. 8 is a diagram showing an exploded view of an example catalytic converter and antitheft system with breakaway bolts in accordance with some implementations.

FIG. 8 is a diagram showing an exploded view of an example catalytic converter 802 and antitheft system with breakaway bolts 804 in accordance with some implementations. The breakaway bolts can be similar to those shown in FIG. 9 and described below.

Figure 9:
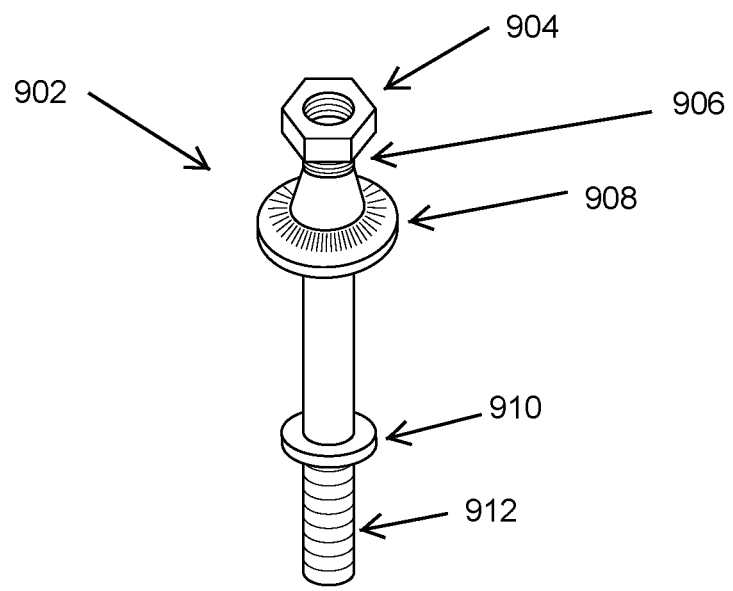
FIG. 9 is a diagram showing example breakaway bolts in accordance with some implementations.

FIG. 9 is a diagram showing an example breakaway bolt 902 in accordance with some implementations. In particular, the breakaway bolt 902 can include a breakaway head 904, a shank 906 that shears at a given torque (e.g., 32 ft-lbs.), an optional upper spring stop 908 (for vehicles that utilize a spring on the catalytic converter bolts), a bolt stop 910, and a bolt portion 912 (e.g., 10 mm×1.25 thread bolt).

The example breakaway bolts shown in FIG. 9 and elsewhere include a spring stop. Some implementations may not include this feature, as not all vehicles have springs at these bolts. For example, a spring may be used to attach the exhaust to the manifold to help alleviate issues such as those caused by metal expansion.

Figure 10:
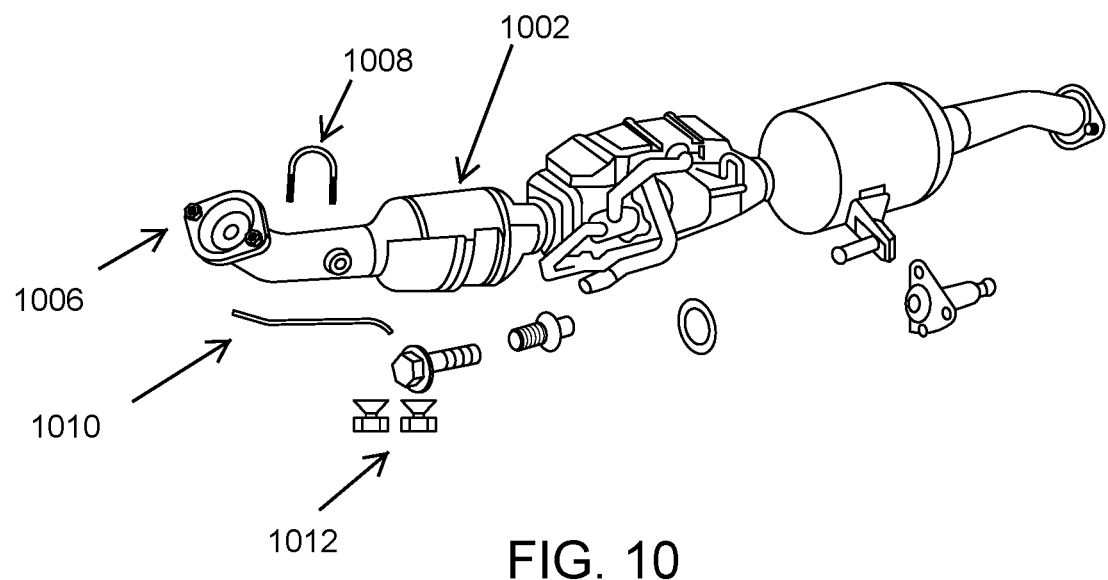
FIG. 10 is a diagram showing an exploded view of an example catalytic converter and antitheft system with medium exhaust pipe section cover in accordance with some implementations.

FIG. 10 is a diagram showing an exploded view of an example catalytic converter 1002 and antitheft system with medium exhaust pipe section cover in accordance with some implementations. The antitheft system includes two breakaway security bolts 1004 that can be used to secure the catalytic converter to the exhaust manifold apertures 1006. The antitheft system also includes a ubolt 1008 (or other suitable fastener), an exhaust pipe section cover 1010, and breakaway nuts 1012 used to attach the exhaust pipe section cover 1010 to an exhaust pipe using the ubolt 1008.

Figure 11:
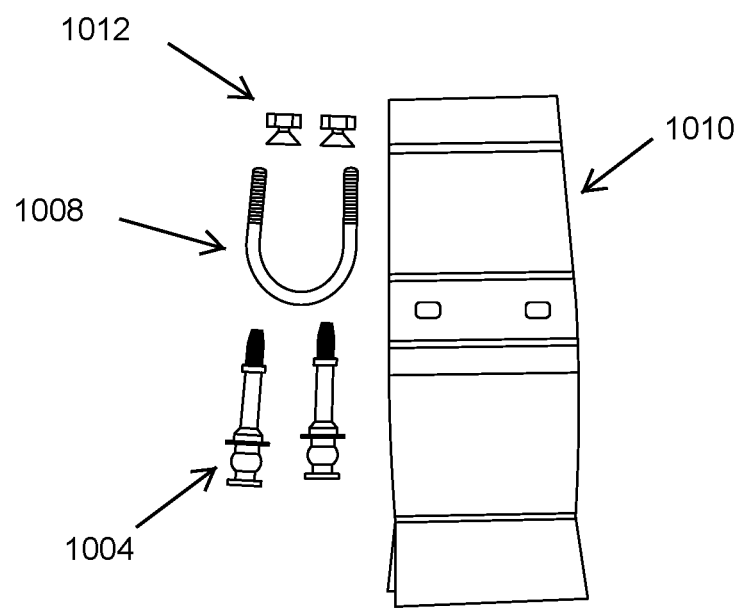
FIG. 11 is a diagram showing parts of an example catalytic converter antitheft system with medium exhaust pipe cover in accordance with some implementations.

FIG. 11 is a diagram showing parts of an example catalytic converter antitheft system with medium exhaust pipe cover 1010 in accordance with some implementations.

FIG. 12 is a diagram of an example breakaway nut 1202 in accordance with some implementations. The breakaway nut includes a breakaway head 1204 that can be engaged by a tool, such as a socket wrench. The breakaway head is constructed to twist off above a certain torque leaving a fastener that is rounded 1206 and is difficult, if not impossible, to be engaged by a tool for removal.

FIG. 13 is a diagram of an example conversion stud 1302 in accordance with some implementations. As described above, the conversion stud 1302 can be used to attach an exhaust flange bolt shield to an exhaust manifold.

Figure 14:
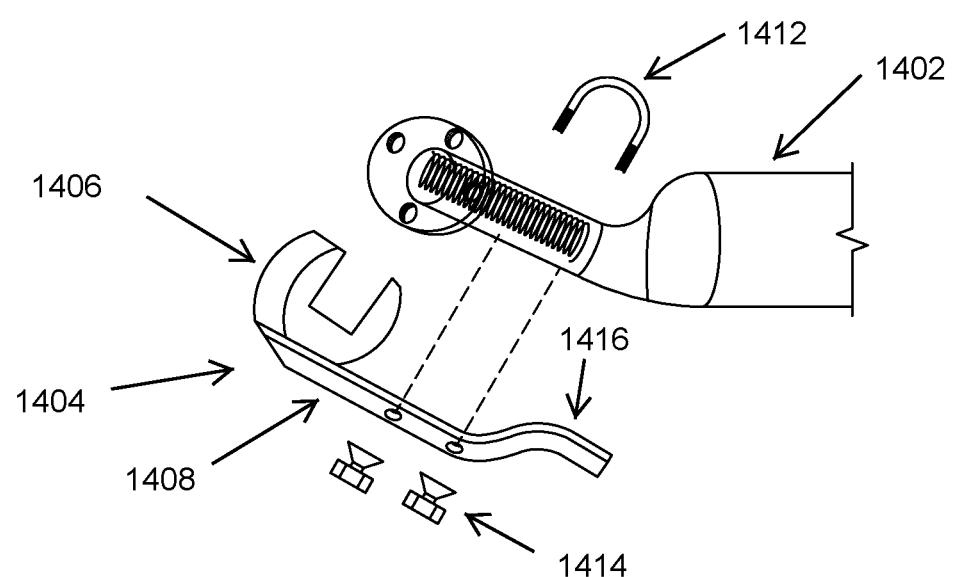
FIG. 14 is a diagram showing an exploded view of an example catalytic converter and single piece antitheft system in accordance with some implementations.

FIG. 14 is a diagram showing an exploded view of an example catalytic converter 1402 and single piece antitheft system 1404 in accordance with some implementations. The single piece antitheft system 1404 includes a cage (e.g., welded cage) 1406 to help prevent catalytic converter bolts from being removed. The single piece antitheft system 1404 can include a plate 1408 (e.g., a 6" wide plate) that has two apertures 1410 to receive a fastener 1412 (e.g., a ubolt) that can be attached with breakaway security nuts 1414. The single piece antitheft system 1404 can also include a dove tail section 1416 to help prevent the plate from damaged the catalytic converter 1402.

Figure 15:
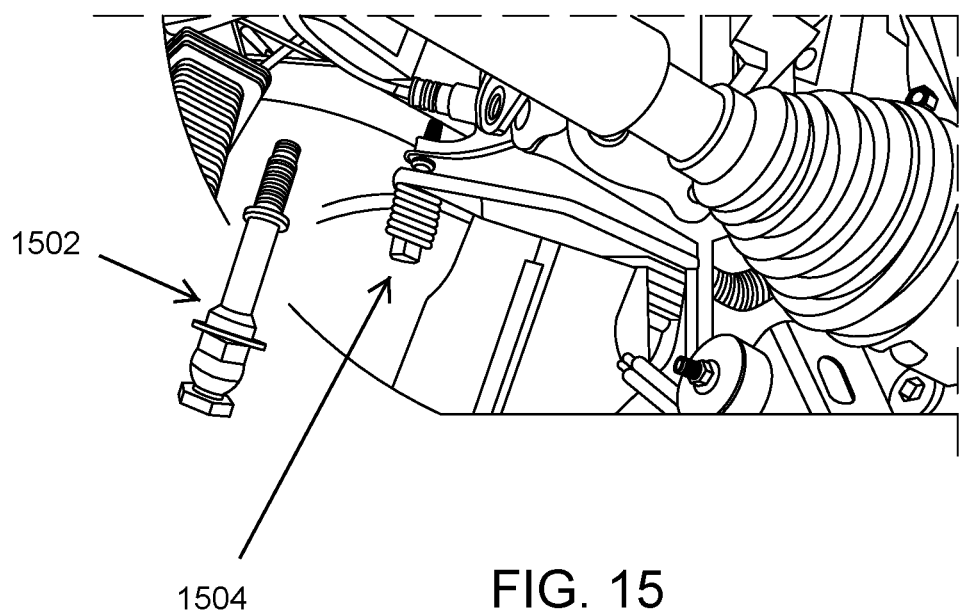
FIG. 15 is a diagram showing an example breakaway security bolt and installation location in accordance with some implementations.

FIG. 15 is a diagram showing an example breakaway security bolt 1502 and installation location 1504 in accordance with some implementations. The breakaway security bolt 1502 is similar to 902 and others discussed above.

Figure 16:
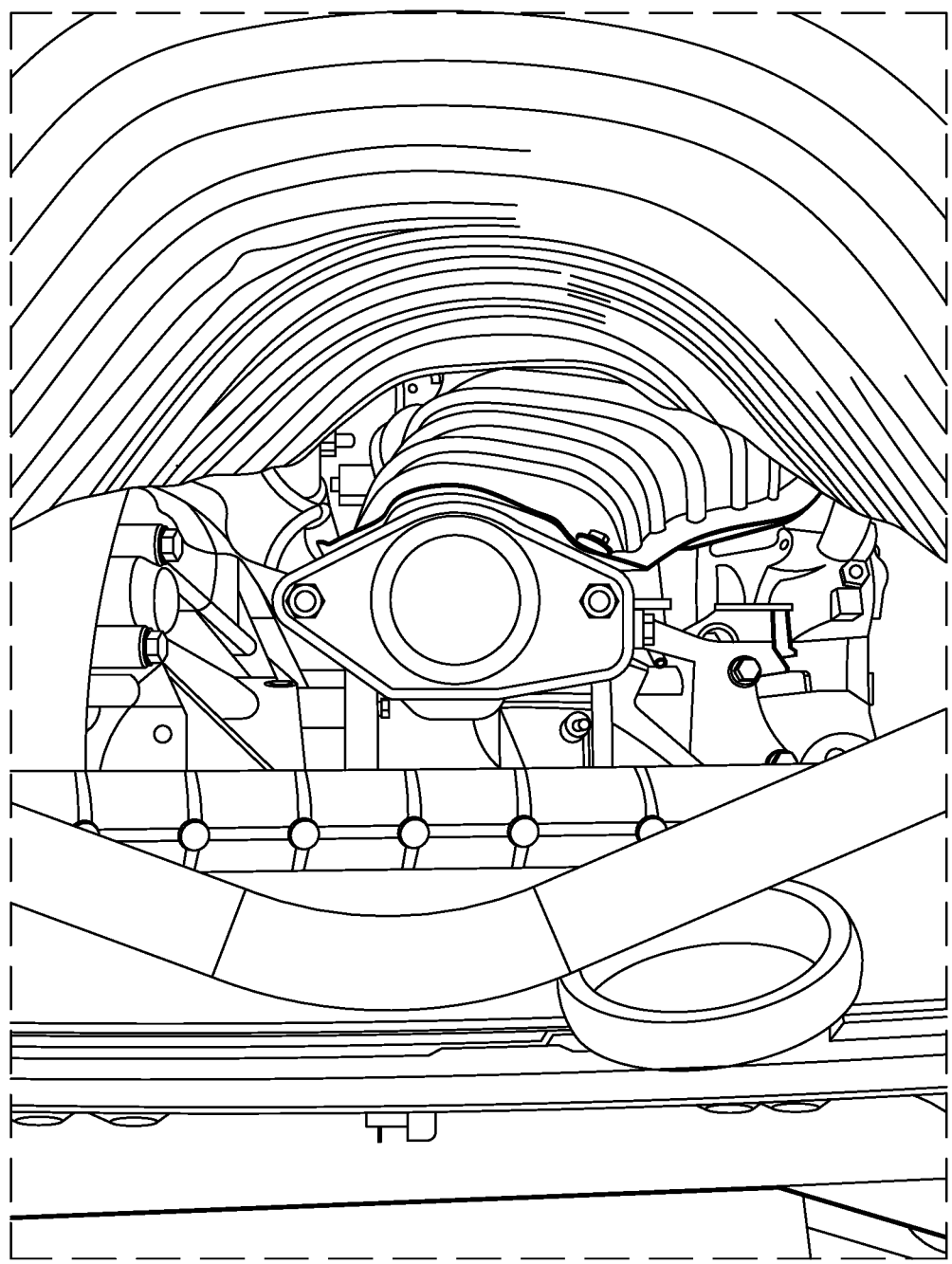
FIG. 16 is a diagram showing an example of the remnants of a theft of front catalytic converter at exhaust manifold.

FIG. 16 is a diagram showing an example exhaust manifold with threaded apertures to receive bolts to secure a catalytic converter to the vehicle exhaust manifold.

Figure 17:
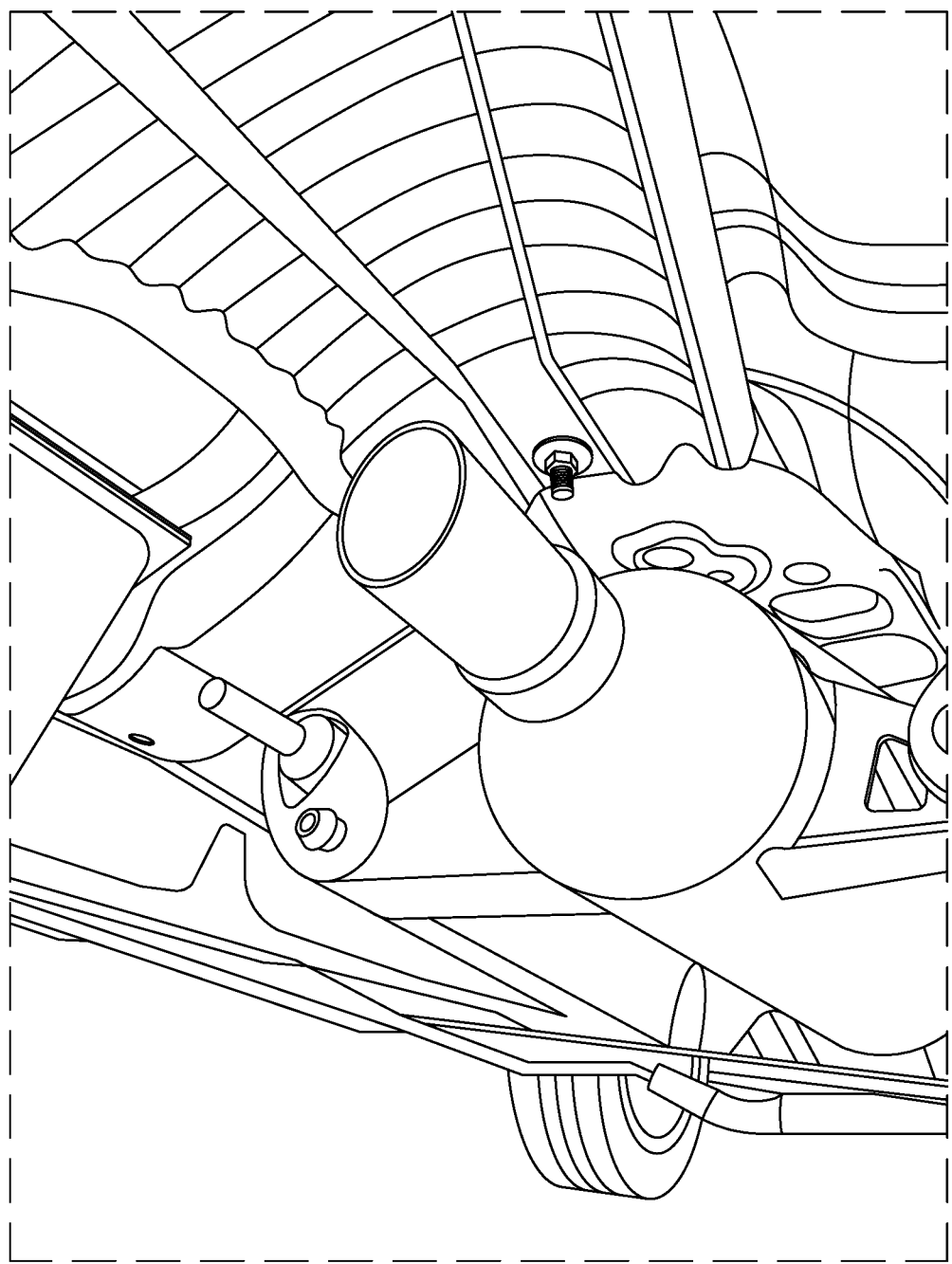
FIG. 17 is a diagram showing an example of an exhaust pipe cut after theft to remove the catalytic converter.

FIG. 17 is a diagram showing an example exhaust pipe cut to remove a catalytic converter.

Figure 18:
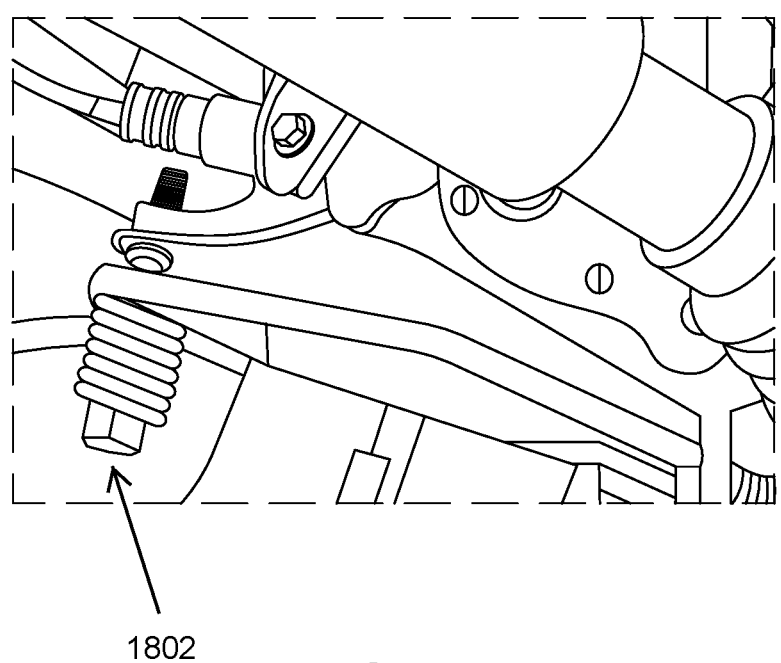
FIG. 18 is a diagram of an example exhaust flange bolt and spring.

FIG. 18 is a diagram of an example exhaust flange bolt and spring 1802 that is often removed when a thief steals a catalytic converter.

Figure 19:
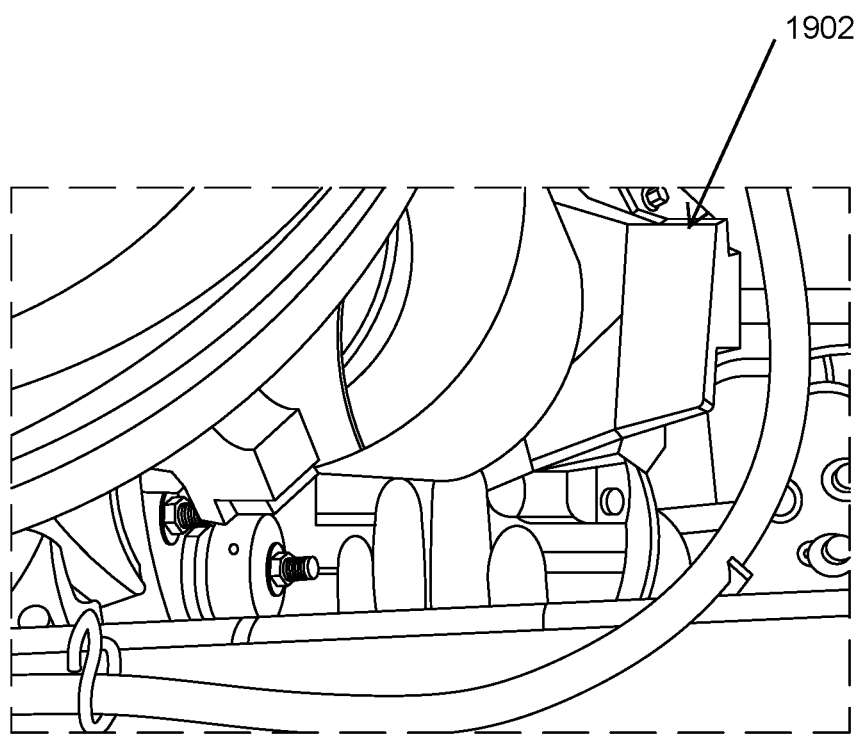
FIG. 19 is a diagram of an example exhaust flange bolt shield in accordance with some implementations.

FIG. 19 is a diagram of an example exhaust flange bolt shield 1902 in accordance with some implementations, which is similar to 104 and 604 discussed above.

Figure 20:
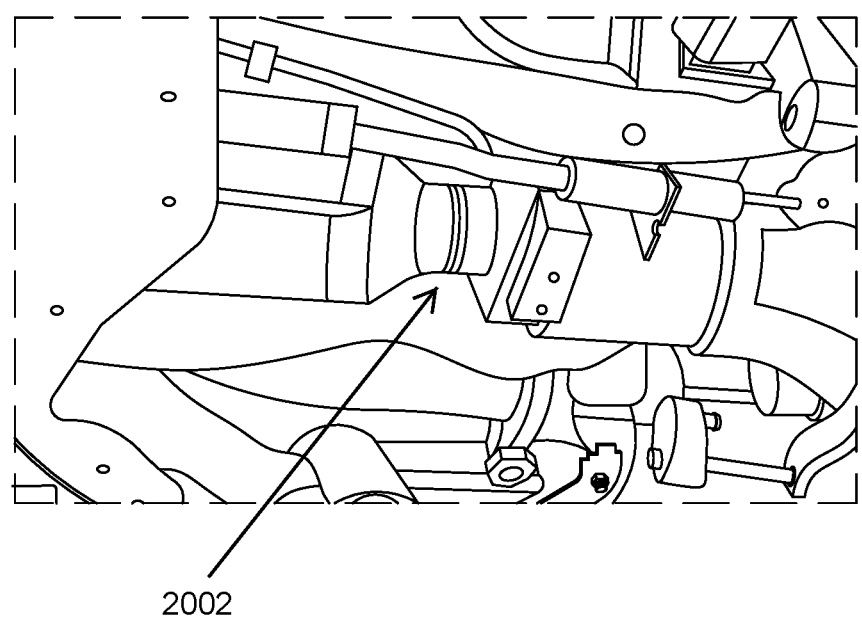
FIG. 20 is an exemplary diagram of an exhaust pipe section.

FIG. 20 is a diagram of an exhaust pipe section 2002 that is a point that thieves cut to remove a catalytic converter.

Figure 21:
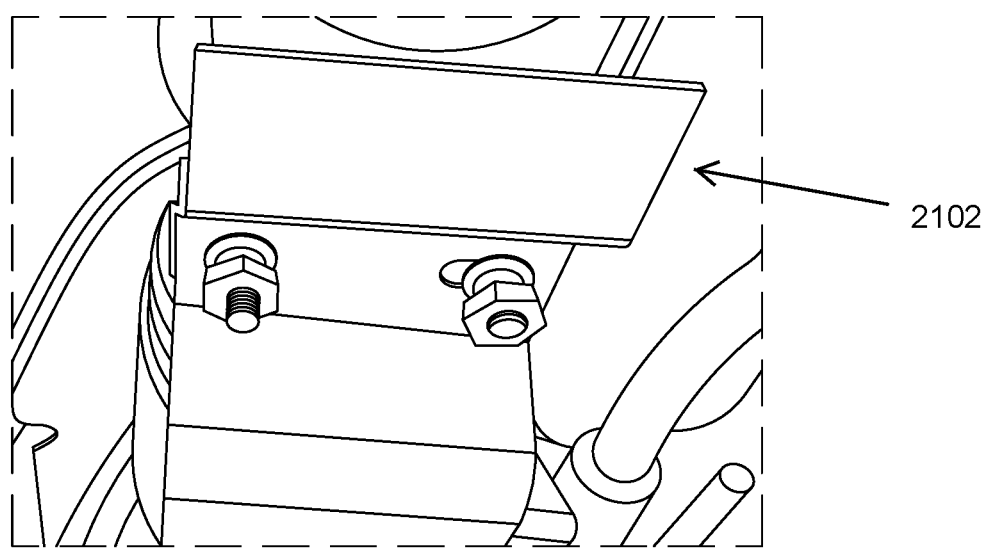
FIG. 21 is a diagram of an example exhaust pipe section cover installed over the exhaust pipe section shown in FIG. 20 in accordance with some implementations.

FIG. 21 is a diagram of an example exhaust pipe section cover 2102 installed over the exhaust pipe section shown in FIG. 20 in accordance with some implementations. The exhaust pipe section cover 2102 can be similar to 110, 610, and 1010 discussed above, where the main difference is in a length of the exhaust pipe section cover.

Figure 22:
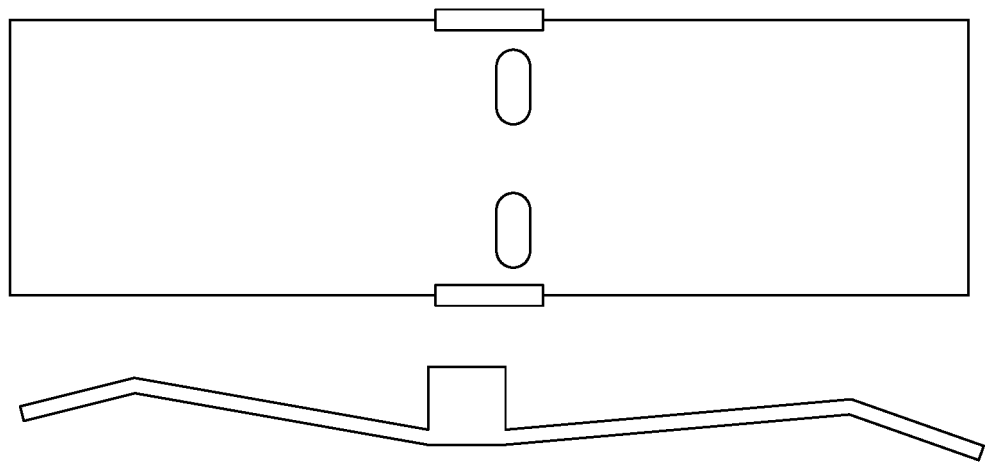
FIG. 22 is a diagram of an example exhaust pipe section cover in accordance with some implementations.

FIG. 22 is a diagram of an example exhaust pipe section cover in accordance with some implementations, such as 110, 610, and 1010 discussed above.

Figure 23:
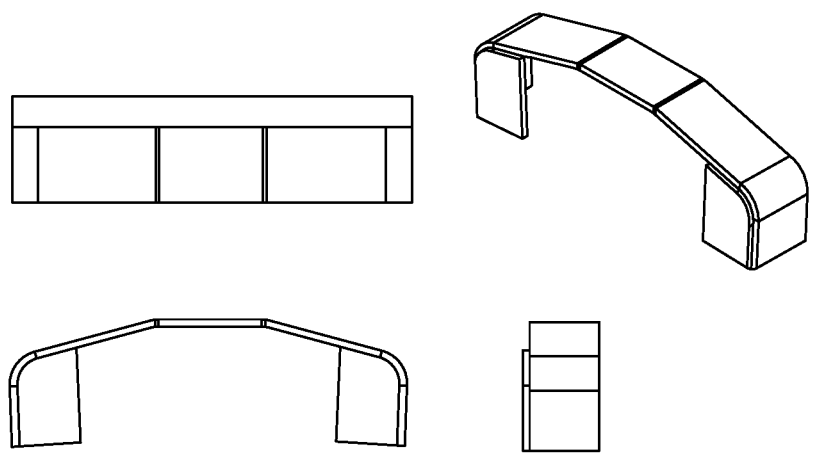
FIG. 23 shows a classical 3 drafting views of an example exhaust flange bolt shield in accordance with some implementations that may be suited for bolt protection of various exhaust designs that may require smaller cross sections.

FIG. 23 shows various views of an example exhaust flange bolt shield in accordance with some implementations.

While some example implementations have been described in terms of a general embodiment with several specific example modifications, it is recognized that other modifications and variations of the embodiments described above are within the spirit and scope of the disclosed subject matter. Applicant intends to embrace any and all such modifications, variations and embodiments.

What is claimed is:

1. A catalytic converter anti-theft system comprising:
an exhaust flange bolt shield configured to be attached to one or more points near an exhaust flange via one or more corresponding security bolt fasteners, wherein the exhaust flange bolt shield includes one or more bolt covers configured to cover one or more exhaust flange bolts; and
an exhaust pipe section cover configured to be attached to an exhaust pipe section adjacent a catalytic converter so as to cover at least a portion of the exhaust pipe section, wherein the exhaust pipe section cover is attached to the exhaust pipe section via one or more arcuate members and one or more corresponding security fasteners, wherein the exhaust pipe section cover includes a body portion having two apertures for fastening the exhaust pipe section cover to the exhaust pipe section, and a first angled member attached to a first side of the body portion and a second angled member attached to a second side of the body portion opposite the first side of the body portion.

2. The catalytic converter anti-theft system of claim 1, wherein the exhaust flange bolt shield and the exhaust pipe section cover are formed from one or more of steel, hardened steel, case hardened steel, or tempered steel.

3. The catalytic converter anti-theft system of claim 1, wherein the exhaust flange bolt shield and the exhaust pipe section cover are separate pieces.

4. The catalytic converter anti-theft system of claim 1, wherein the exhaust flange bolt shield includes: a first recess disposed at a first end of the exhaust flange bolt shield configured to fit over a first catalytic converter manifold bolt, and a second recess disposed at a second end of the exhaust flange bolt shield configured to fit over a second catalytic converter manifold bolt.

5. The catalytic converter anti-theft system of claim 1, wherein each of the one or more corresponding security fasteners is a break-away security nut.

6. The catalytic converter anti-theft system of claim 5, wherein the break-away security nut is configured to break away at a given torque level.

7. A catalytic converter anti-theft system comprising:
a single piece catalytic converter cover configured to cover an exhaust pipe section and one or more exhaust manifold bolts, wherein the single piece catalytic converter cover is attached to an exhaust system at one end of a catalytic converter,
wherein the single piece catalytic converter cover is configured to be attached to an exhaust pipe section adjacent the catalytic converter so as to cover at least a portion of the exhaust pipe section, wherein the single piece catalytic converter cover is attached to the exhaust pipe section via one or more arcuate members and one or more corresponding breakaway security nuts, wherein the single piece catalytic converter cover includes a dove tail configuration at an end of the single piece catalytic converter cover opposite to an end of the single piece catalytic converter connected to a manifold.

8. The catalytic converter anti-theft system of claim 7, wherein the single piece catalytic converter cover is formed from one or more of steel, hardened steel, or tempered steel.

9. The catalytic converter anti-theft system of claim 7, wherein the single piece catalytic converter cover includes a body portion having two apertures for fastening the single piece catalytic converter cover to the exhaust pipe section.

* * * * *